(12) United States Patent
Demark et al.

(10) Patent No.: US 8,620,799 B2
(45) Date of Patent: Dec. 31, 2013

(54) UNIVERSAL LEDGER

(75) Inventors: Michele Demark, Highlands Ranch, CO (US); Mike Michelsen, Arvada, CO (US); Diane Scott, Lone Tree, CO (US); Chris Cochran, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 207 days.

(21) Appl. No.: 13/008,393

(22) Filed: Jan. 18, 2011

(65) Prior Publication Data

US 2012/0185383 A1    Jul. 19, 2012

(51) Int. Cl.
*G06Q 40/00*    (2012.01)

(52) U.S. Cl.
USPC .............................................. 705/38; 705/35

(58) Field of Classification Search
USPC ...................................... 705/35, 38
See application file for complete search history.

(56) References Cited

U.S. PATENT DOCUMENTS

| | | | | |
|---|---|---|---|---|
| 8,412,630 | B2 * | 4/2013 | Ross et al. | 705/42 |
| 2004/0006531 | A1 * | 1/2004 | Kwan | 705/37 |
| 2007/0083462 | A1 * | 4/2007 | Cubillo et al. | 705/38 |
| 2008/0034061 | A1 * | 2/2008 | Beares | 709/218 |
| 2009/0210340 | A1 * | 8/2009 | Mittal et al. | 705/38 |
| 2010/0010935 | A1 * | 1/2010 | Shelton | 705/36 R |
| 2010/0030578 | A1 * | 2/2010 | Siddique et al. | 705/3 |
| 2010/0241546 | A1 * | 9/2010 | Thomas et al. | 705/35 |
| 2011/0112957 | A1 * | 5/2011 | Ingram et al. | 705/38 |
| 2011/0166928 | A1 * | 7/2011 | Robinson et al. | 705/14.49 |
| 2011/0265148 | A1 * | 10/2011 | Tam et al. | 726/4 |
| 2011/0320342 | A1 * | 12/2011 | Kremen | 705/38 |
| 2012/0130876 | A1 * | 5/2012 | Voisin | 705/35 |
| 2012/0179753 | A1 * | 7/2012 | Welingkar et al. | 709/204 |
| 2012/0197731 | A1 * | 8/2012 | Rampell et al. | 705/14.64 |
| 2012/0209677 | A1 * | 8/2012 | Mehta et al. | 705/14.16 |

* cited by examiner

*Primary Examiner* — Lalita M Hamilton
(74) *Attorney, Agent, or Firm* — Kilpatrick Townsend & Stockton, LLP

(57) ABSTRACT

The present invention provides systems and methods for tracking obligations incurred between individuals. The method may include receiving a request from a first party, where the request includes an expense incurred by the first party for the benefit of a second party. The method may also include providing a notice of the request to the second party and receiving an acceptance from the second party to assume an obligation associated with the expense. The method may further include associating the obligation with the second party and associating a benefit with the first party. The obligation and/or benefit may be substantially equal in value to the expense. The method may additionally include interfacing with a social network service to provide the social network service with information about the obligation and/or the benefit.

17 Claims, 8 Drawing Sheets

| Ledger | 504 | 506 | 508 | |
|---|---|---|---|---|
| Name | Expense | Amount | Date | Settled |
| Tim | Lunch | $5 | 5/2/xx | |
| Joseph | Hockey Game | $25 | 5/10/xx | |
| Deangelo | Parking Ticket | -$20 | 6/3/xx | |
| Tanisha | Movie | -$10 | 6/10/xx | |
| Maria | Dinner | $10 | 6/15/xx | |
| Tony | Pizza | $10 | 4/25/xx | ✓ |

UNIVERSAL LEDGER

BACKGROUND OF THE INVENTION

Verbal agreements, both large and small, are often entered into between friends, coworkers, and/or associates. Often, one or more obligations result from such verbal agreements. For example, coworkers or friends may go to lunch where one of the coworkers or friends may accept to pay the lunch bill for the other coworkers or friends. In paying the bill, it may be expected that the non-paying coworkers or friends will return the favor at a future date by either paying for a future lunch or repaying the friend or coworker that covered the bill. Obligations may also arise in other circumstances, such as paying for movie tickets, loaning money, paying for gas, etc. Over time an individual may have numerous obligations for which repayment is expected. These numerous obligations may result in a significant amount of debt owed to others. However, these obligations may be hard to remember or keep track of, especially when they are numerous, comprise small values, and/or arose in the distant past. Sometimes such obligations remain unsettled or unpaid due to one or more individuals forgetting about the obligations and/or an individual believing that a returned favor constitutes repayment. Similarly, individuals may differ as to what constitutes repayment and/or to what extent an obligation is repaid or settled.

On a nationwide or worldwide scale, these unsettled or unpaid obligations may represent a significant amount of unsettled debt. Further unsettled or unpaid obligations may be the source of friction in relationships between friends, coworkers, and/or associates and/or may impede future relationships between such individuals. For example, a friend or coworker may have a difficult time asking for settlement and/or repayment of an owed obligation. Similarly, an individual that owes an obligation may feel harassed by a friend or coworker that is continually asking for settlement or repayment of an obligation even if the individual plans on settling the obligation. In extreme cases, unsettled obligations may result in a termination of a friendship or association. In less extreme cases, unsettled obligations may cause friends, coworkers, and/or associates to be hesitant in providing future favors for individuals with unsettled obligations. For example, a friend may be less willing to pay for lunch when an obligation remains outstanding. Repayment or settlement of obligations may be further complicated as associations become more distant and/or strained. For example, the difficulty in settling obligations may increase if a coworker leaves or loses their job and/or if a friend moves out of town.

BRIEF SUMMARY OF THE INVENTION

The present invention provides systems and methods for tracking obligations incurred between individuals that may be associated with a social network service. According to one embodiment, a tracking system for tracking such obligations may include a communication interface that enables the tracking system to interface with the social network service. The tracking system may also include a processor and a non volatile memory that include instructions that may direct the processor to perform one or more operations. The operations performed by the processor may include receiving a request from a first user of the social network service, where the request includes an expense incurred by the first user for the benefit of a second user of the social network service. The operations may also include providing a notice of the request to the second user and receiving an acceptance from the second user to assume an obligation associated with the expense. The obligation may be substantially equal in value to the expense.

The operations may further include associating the obligation with the second user and associating a benefit with the first user. The benefit may be associated with the expense and may be substantially equal in value to the expense. The operations may additionally include interfacing with the social network service via the communication interface to provide the social network service with information about the benefit and/or the obligation. The operations may additionally include receiving an acceptance from a third user of the social network service to assume an additional obligation associated with an expense incurred by the second user for the benefit of the third user. The operations may further include associating the additional obligation with the third user and associating a benefit with the second user. The operations may further include transferring the benefit associated with the second user to the first user to settle at least a portion of the obligation associated with the second user.

The operations may further include receiving a settlement from the third user to satisfy at least a portion of the additional obligation, providing the settlement to the first user, and reducing the benefit associated with the first user by the value of the settlement. The operations may further include updating a first tally associated with the first user to reflect the benefit and updating a second tally associated with the second user to reflect the obligation, where the first tally and second tally include a sum of the benefits and obligations associated with the first user and second user respectively.

The request provided by the first user may also include an additional expense incurred by the first user for the benefit of a third user associated with the social network service. The operations may additionally include providing a notice of the request to the third user and receiving an acceptance from the third user to assume an obligation associated with the additional expense. This obligation may be substantially equal in value to the additional expense and the operations may additionally include associating the additional obligation with the third user. The operations may additionally include associating an additional benefit with the first user that is substantially equal in value to the additional expense and interfacing with the social network service to provide the social network service with information about the additional benefit and/or the obligation.

The request provided by the first user may further include an expense incurred by a fourth user for the benefit of the second user and/or third user. The acceptance from the second and/or third user may include an additional acceptance to assume an additional obligation associated with the expense incurred by the fourth user. The operations may additionally include associating the additional obligation with the second and/or third user and associating a benefit with the fourth user that may be substantially equal in value to the expense incurred by the fourth user.

The operations may additionally include receiving a settlement request from the second user that includes an expense incurred by the second user to satisfy at least a portion of the obligation. The operations may additionally include providing a notice of the settlement request to the first user and receiving an acceptance of the settlement request from the first user. The operations may additionally include reducing the obligation of the second user and/or the benefit of the first user by an amount substantially equal to the expense incurred by the second user. The operations may further include receiving settlement funds from the second user to satisfy at least a portion of the obligation, transferring the funds to the first user, and reducing the obligation of the second user and/or the benefit of the first user by an amount substantially equal to the settlement funds.

According to another embodiment, a method for tracking obligations may include associating a first party with an obligation tracking network that is configured to keep an account of obligations incurred between individuals in the obligation tracking network. The method may also include receiving a request from the first party, where the request includes an expense incurred by the first party for the benefit of a second party. The method may further include providing a notice of the request to the second party and receiving an acceptance from the second party to assume an obligation associated with the expense, where the obligation may be substantially equal in value to the expense. The method may additionally include associating the obligation with the second party and associating a benefit with the first party, where the benefit may be substantially equal in value to the expense.

The method may additionally include updating a first tally associated with the first party to reflect the benefit and/or updating a second tally associated with the second party to reflect the obligation, where the first tally and the second tally include a sum of the benefits and obligations associated with the first and second parties respectively. The method may additionally include providing a social network service with information about the obligation, the benefit, the first tally, and/or the second tally. The method may additionally include displaying the benefit and/or first tally on a first profile associated with the first party and/or displaying the obligation and/or second tally on a second profile associated with the second party.

According to another embodiment, an obligation tracking system may be communicatively coupled with one or more social network service that provide social networking between individuals and the obligation tracking system may be configured to perform one or more operations to track obligations incurred by the individuals. The operations may include receiving a request from a first user of a first social network service. The request may include an expense incurred by the first user for the benefit of a second user of a second social network service. The operations may also include providing a notice of the request to the second user and receiving an acceptance from the second user to assume an obligation associated with the expense, where the obligation may be substantially equal in value to the expense.

The operations may further include associating the obligation with the second user and associating a benefit with the first user, where the benefit may be substantially equal in value to the expense. The operations may additionally include providing the first social network service with information about the benefit and providing the second social network service with information about the obligation. The operations may additionally include receiving a settlement from the second user to satisfy at least a portion of the obligation, providing the settlement to the first user, and providing the first social network service and the second social network service with information about the settlement. The first social network service and the second social network service may be different social network services.

The operations may additionally include associating the settlement with the first user and the second user, updating a first tally associated with the first user, and updating a tally associated with the second user, where the first tally and second tally include a sum of benefits, obligations, and settlements associated with the first user and second user respectively. Receiving a settlement from the second user may include receiving funds from the second user and providing the settlement to the first user may include transferring the funds to a first account associated with the first user. The first account may be maintained by the obligation tracking system.

Alternatively or additionally, receiving a settlement from the second user may include receiving funds from the second user and providing the settlement to the first user may include providing an identifier to the first user in response to receiving the funds, receiving the identifier from the first user, and providing the funds to the first user in response to receiving the identifier. In addition, the operations may additionally include receiving a notification instruction from the first user, where the notification instruction directs the obligation tracking system to notify the second user to provide the settlement.

BRIEF DESCRIPTION OF THE DRAWINGS

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Figure 1:
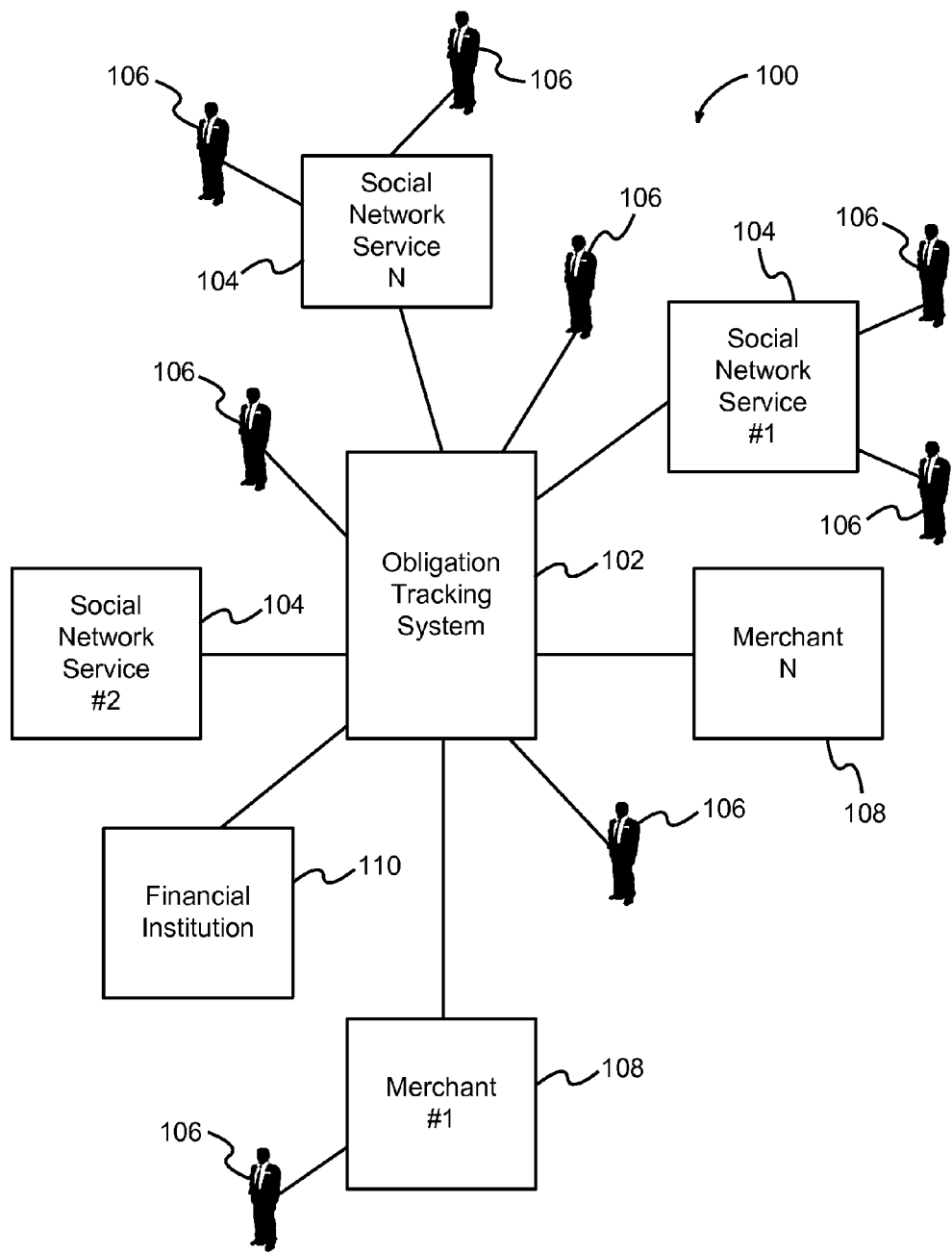
FIG. 1 illustrates a simplified block diagram of an embodiment of an obligation tracking system.

The present invention provides systems and method for tracking obligations incurred between individuals. The obligation tracking system may be used with one or more social network services so that information can be exchanged between the obligation tracking system and the social network services to track obligations. As used herein, the term "obligation" may refer to any type of favor and/or repayment that is owed to an individual or is owed by an individual. For example, an obligation may include a promise to pay for a meal the next time friends get together or may include repayment of funds between individuals, such as the repayment of money lent by a friend. Similarly, the term may include other promises, such as the promise to watch a friend's dog in exchange for paying a bill or helping a friend fix a car in exchange for borrowing the car. Essentially, an obligation may include any responsibility or duty that a person has for or toward another person that results from some sort of agreement between the individuals. The term "benefit" is also used herein to generally describe an obligation from the perspective of a recipient of an obligation. In other words, a benefit is a credit, payment, or reward that results when an obligation is settled or repaid. For example, when an obligation involves a friend agreeing to pay for another friend's meal at a future date, the obligation is the responsibility to pay for the meal and the benefit is the free meal that results. The terms "credit" and "debt" may also be used herein to describe specific benefits and obligations that involve the transfer of funds.

The obligation tracking system may allow individuals to easily track and settle obligations. Obligations may arise as a result of favors provided and/or expenses incurred by one individual on behalf of another individual. For example, the obligation tracking system may record obligations between individuals and keep an updated tally on the benefits and obligations for each individual. The obligation tracking network may keep information about the date the obligation was incurred, the amount of the obligation, the person who the obligation benefits, the expense associated with the obligation, whether the obligation was settled, etc. The obligation tracking system may provide the updated tally and/or information about each obligation to one or more social network services so that an indicator of the obligations and/or benefits for each individual may be displayed on an individual's profile maintained by the social network service(s). One benefit among many of the obligation tracking system and/or social network service providing updated information about obligations is the increased likelihood that obligations will be settled and/or the increased speed at which obligations may be settled. For example, individuals may tend to forget that they owe or are owed obligations. As a result, some obligations may not be repaid or repayment may be delayed while details about the obligations are worked out (who owes what and how much is owed). Keeping track of such obligations removes the burden from individuals to remember when an obligation was incurred, how much the obligation involved, and whether the obligation was settled.

The obligation tracking system may keep track of obligation regardless of the amount of the obligation and/or how the obligation was incurred. For example, the obligation tracking system may keep track of obligations as small as a quarter lent to a friend to buy gum at a candy machine or may keep track of a thousand dollars spent on behalf of a friend for various car parts. The obligation tracking system may also provide a socially acceptable way for individuals to request repayment or settlement of obligations. Since obligations are tracked and each party is aware of outstanding obligations, it may be easier and/or more convenient for an individual to approach another individual and ask for repayment of an outstanding obligation. For example, tension may arise between individuals when repayment is requested because uncertainty may exist as to the validity of the obligation owed, the amount of the obligation, and/or whether subsequent acts and/or favors constitute full or partial repayment of the obligation. The obligation tracking system removes such uncertainty, thereby making it easier to discuss settlement or repayment. Further, repayment requests may be generated and provided by the obligation tracking system, thereby further decreasing the burden of requesting repayment or settlement. Such repayment requests may be generated and provided automatically by the obligation tracking system (e.g., monthly or quarterly reminders and/or when an obligation tally reaches a predetermined threshold) and/or may be provided upon request from one or more individuals that benefit from settlement.

In one embodiment of the invention, obligations and benefits may be tied to the obligation tracking system so that repayment of obligations are owed to the obligation tracking system and benefits are received from the obligation tracking system, thus further decreasing the difficulty associated with settling obligations. For example, when the obligation involves funds, the repayment of funds can be owed to the obligation tracking system and the disbursement of funds can be provided by the obligation tracking system so that no obligation is directly tied to a benefit within the system. Under such an arrangement, when an individual repays an obligation, the funds may go into a community pool of funds out of which the benefits are paid. The disbursement of funds from the community pool may be based on the dates of the various benefits so that the oldest benefits are paid first or the funds may be equally distributed to all persons owed a benefit or the funds may be distributed in any other manner. In such an embodiment, an individual's payment of a benefit is not entirely determined upon a specific obligation being repaid or settled and the system becomes the collector of obligations, thereby removing the burden of collecting from individuals within the system.

In another embodiment, each obligation may be associated with a specific benefit so that settlement of an obligation results in payment of a benefit. For example, if a coworker buys lunch for another coworker, the coworker buying the lunch may receive a benefit that is directly associated with an obligation of the coworker receiving the lunch. Upon settlement of the obligation, the coworker holding the benefit is paid. The obligation tracking system may allow an individual holding a benefit, such as the coworker that bought the lunch, to withdraw funds from the obligation tracking system prior to repayment of an associated obligation. The withdrawal of funds may transfer the benefit from the individual to the obligation tracking system so that the associated obligation is owed to the obligation tracking system instead of the individual. In addition, the obligation tracking system may allow an individual that has accumulated credits or benefits (e.g., the individual that is owed funds and/or has funds available) to provide the credits or benefits to others in the system to help repay obligations they may owe. For example, an individual may be allowed to provide funds to a sibling or friend to repay obligations of the sibling or friend. Making funds available in such a manner may result in reduced fees, additional services, and/or other benefits that may be associated with the obligation tracking system. In yet another embodiment, the obligation tracking system may include a combination of community obligations and benefits and obligations directly associated with benefits.

In addition to tracking repayment of funds, the obligation tracking system may also track obligations and settlements that do not involve funds or money. For example, an individual may agree to buy lunch in exchange for a friend watching the individual's dog on a particular day. The obligation tracking system may record the lunch purchase and track the obligation until the friend watches the individual's dog, after which the obligation will be noted as settled. When the obligation does involve the repayment of funds, the obligation tracking system may be configured to receive funds from one party and provide the funds to another party (i.e., transfer funds between parties). For example, one party may provide funds to the obligation tracking system, such as by providing cash, credit card, ACH transfer, gift cards, prepaid cards, etc., and the obligation tracking system may provide the funds to another party, such as by depositing the funds in a bank, providing a check, providing cash, providing a gift certificate, etc. To receive and/or provide funds, the obligation tracking system may be communicatively coupled with one or more financial institutions. Likewise, in an exemplary embodiment, the obligation tracking system may work with a money transfer system capable of performing wire transfers so that individuals may provide and/or receive cash at any one of many money transfer locations throughout the world.

The obligation tracking system may transfer benefits or funds between individuals in the system so that repayment of obligations automatically occurs. For example, when an individual owes an obligation and that individual is subsequently credited with a benefit, the benefit may be transferred to the recipient of the obligation as full or partial payment of the obligation. For example, if individual A owes $25 to individual B and individual A is credited with a benefit of $10 (e.g., individual C owes individual A $10), the $10 benefit may be transferred to individual B as partial repayment of the $25 owed by individual A. Upon receiving payment of the $10, the funds may be automatically transferred to individual B instead of individual A. If individual B subsequently owes individual D $5, then $5 of the $10 may be automatically transferred to individual D. Because the system may involve numerous individuals each having various obligations and benefits, the automatic transfer of benefits may be quite complex. The obligation tracking system, however, may keep a full accounting of each individual's benefits and obligations to ensure that obligations are quickly settled and/or that benefits are quickly paid. As a result, a settlement (payment of funds) provided by one person in the system may end up repaying another person in the system completely removed from the payor. In addition, the obligation tracking system may receive payments from a business and/or employer and route the funds into an account of an individual associated with the business and/or employer. These funds may subsequently be automatically routed or transferred to other individuals to settle or repay the individual's obligations. These and other advantages of the present invention will become more apparent with reference to the figures.

In addition, the obligation tracking system may aggregate payments from one or more individuals and/or to one or more individuals to reduce the transaction fees. For example, if the same funding source is used to pay or settle one or more obligations, the payments could be aggregated so that only a single transaction fee is incurred. For example, if individual A owed three separate friends money for various obligations and individual A used the same credit card to repay each of the friends, the transactions could be aggregated into one transaction to reduce a fee charged to process the transaction(s). The obligation tracking system could receive the aggregated payment and divide the funds between each of the friends. Further, the details of the aggregated charge could be provided via an electronic invoice. For example, an electronic invoice that details the aggregated charge could be provided to individual A via email, MMS and/or SMS message, etc.

FIG. 1 depicts a block diagram 100 of an embodiment of an obligation tracking system 102. The obligation tracking system 102 may connect one or more social network sites or services 104 together. For example, the obligation tracking system 102 may connect a first social network service, a second social network service, and an nth social network service, where n represents any positive integer value. Such social network services 104 may provide social networking between individuals or users 106. For example, social network services often provide the user 106 with a customizable profile that displays information about the individual. Some social network services may provide business related social networking, such as by allowing a user 106 to display information about a career or profession on the user's profile. Other social network may provide recreational or personal related networking allowing friends and/or associates to maintain connections to each other and allowing users to display information about themselves and their lives.

The obligation tracking system 102 and/or social network services 104 may be used to track obligations incurred between individuals 106 associated with the obligation tracking system and/or social network services 104. For example, in one embodiment, the social network services 104 may provide an indicator that displays the obligation status of the user. The obligation status may be a sum of the obligations and benefits associated with the user 106. In addition, the indicator may be colored to show whether the user 106 has a net positive obligation status (the sum of obligations and benefits is a positive value so that overall the user is owed repayment of obligations) or to show whether the user has a net negative obligation status (the sum of obligations and benefits is a negative value so that overall the user is responsible to repay obligations). For example, the indicator may be red to indicate a net negative obligation status or may be green to indicate a net positive obligation status. The indicator may be updateable so that the obligation status of the user 106 may be dynamically updated as obligations and/or benefits are incurred. In addition, the indicator may include a value amount of the obligations and/or benefits associated with the user 106. The value amount may facilitate in other users determining whether to incur expenses and/or provide favors for the benefit of the profiled user. For example, if the indicator shows that user A has a significant net negative obligation status (e.g., −$200), user B may decide not to buy lunch for user A due to an increased possibility of not being repaid. In contrast, if user A has a significant net positive obligation status (e.g., +$200), user B may decide to pay a bill for user A because of an increased likelihood of being repaid.

The obligation tracking system may also allow individuals or users 106 associated with different social network services to track obligations and/or benefits incurred between those individuals and/or see the obligation status of an individual associated with different social network services. For example, user A may be associated with a first social network service and may have incurred an expense for the benefit of user B that may be associated with a second social network service. Even though the users are associated with different social network services, user A may track user B's obligation that is associated with user A's expense. Further, user A may be able to see the obligation status of user B to determine whether the obligation status is net positive or negative and thereby decide whether to incur additional expenses. In one embodiment, the obligation tracking system 102 may provide a user profile and/or an updated tally of the obligations and/or benefits associated with a user 106 so that the user does not need to be associated or registered with a social network service 104. For example, FIG. 1 depicts users 106 directly interacting, connecting, or otherwise associating with the obligation tracking system 102. The user 106 may interact with other users 106 directly associated with the obligations tracking system 102 and/or may interact with users 106 associated with a social network service 104 to thereby track obligations and/or benefits incurred between these users. In another embodiment, the user 106 may be associated with a social network service 104, but may also have a separate obligation tracking profile maintained by the obligation tracking system 102.

The obligation tracking system 102 may also be connected or otherwise interact with one or more merchants 108 (shown as a first merchant and an nth merchant) so that information about expenses incurred can be provided by the merchants 108 and/or by individuals 106 at the merchant. For example, a group of friends may visit a dining establishment for lunch where one of the friends agrees to cover the lunch bill. Upon paying the bill, the friend may instruct an employee of the merchant 108 (e.g., a waiter or waitress) to submit a request to the obligation tracking system 102 so that a benefit is associated with the friend and an obligation is associated with each person in the group of friends that received a free lunch. The employee may submit the request from a point of sale device or another device of the merchant 108. Alternatively, the friend who purchased lunch may submit the request and may enter a merchant code or purchase code while submitting the request that identifies the merchant and/or the expense incurred at the merchants locations (e.g., identifies that the friend purchased lunch at the merchant location). The purchase information may be submitted to the obligation tracking system 102 by the merchant 108 and/or may be downloaded from a database. The obligation tracking system 102 may further be connected to or otherwise interact with one or more financial institutions 110 to facilitate payment of an obligation and/or benefit. For example, the obligation tracking system 102 may be connected with a user's bank so that the obligation tracking system 102 may receive funds from and/or deposit funds into a user's account maintained by the bank. The financial institution may be other institutions such as a credit card network, money transfer system, etc., so that funds may be received or provided through any means including: an ACH transfer, credit card transaction, check, money order, wire transfer, gift certificate, prepaid card, cash, etc. In an exemplary embodiment, the obligation tracking system 102 may provide and maintain a financial account for the user.

The connections between the obligation tracking system 102, users 106, social network services 104, merchants 108, and/or financial institutions 110 may be any type of connection known in the art that provides communication, such as a public network connection (e.g., the Internet), a private network connection (corporate intranet), a wireless cellular provider's network, etc.

Figure 2:
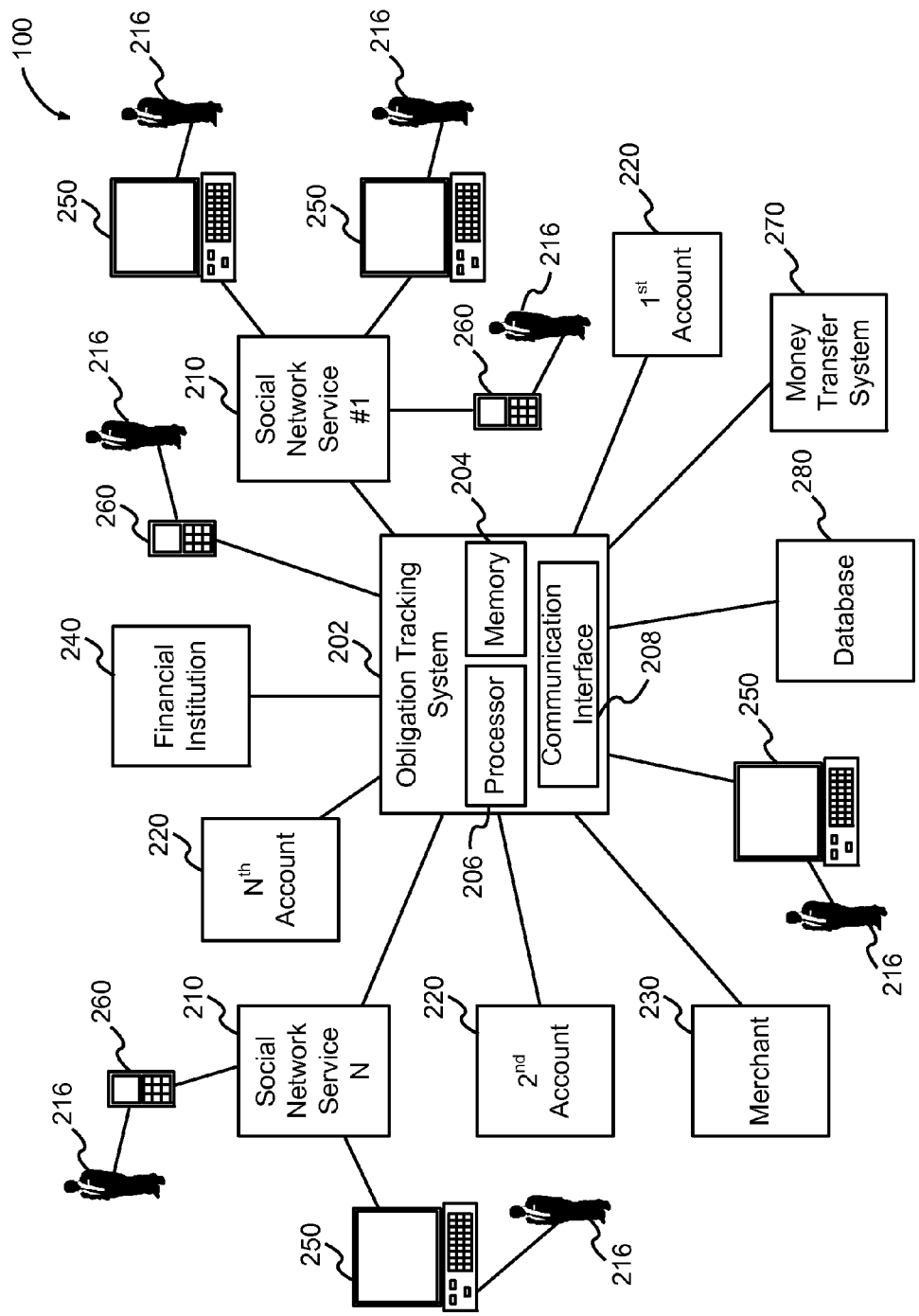
FIG. 2 illustrates a simplified block diagram of another embodiment of an obligation tracking system.

FIG. 2 depicts another block diagram 200 of an embodiment of an obligation tracking system 202. To facilitate communication between users 216 and various entities and/or to perform the various operations described herein (e.g., tracking obligations and benefits, facilitating payment, displaying obligation statuses, providing notifications, transferring obligations and/or benefits, etc.), the obligation tracking system 202 may include a communication interface 208, a processor 206, and/or a memory medium 204. The communication interface 208 may enable the obligation tracking system 202 to interface or otherwise communicate with various users 216, social network services 210, financial institutions, 240, merchants 230, databases 280, etc. The memory medium 204 may include non-volatile memory that may include one or more instructions for performing the various operations described herein. The processor 206 may receive the instructions from the memory medium 204 and may perform the various operations described herein.

As previously described, the obligation tracking system 202 may be communicatively coupled or connected with one or more social network services 210 that provide social networking to one or more users 216. The obligation tracking system 202 may connect with one or more servers of the social network services 210 to provide and receive instructions and communications therebetween. Users 216 may connect with a social network service 210 through a computer 250, a wireless device 260 (such as a cell phone, smart phone, wireless device application, etc.), a laptop, a kiosk, or any other device. The communications and/or connections may be provided through any type of network known in the art as previously described.

A user 216 may register with the obligation tracking system 202 by directly connecting with the system and registering with the system. The user 216 may also register through one of the social network services 210 that the user may be associated with. For example, the obligation tracking system 202 may be advertised on the social network service 210 so that the user 216 can quickly and easily register with the obligation tracking network 202. In one embodiment, the obligation tracking system 202 is a feature that is offered by the social network service 210 so that upon registering with social network service, the user 216 is automatically registered with the obligation tracking network. In another embodiment, when the user 216 sends a request to the obligation tracking system 202 to associate an obligation with a friend, the obligation tracking system may determine whether the friend is registered with the obligation tracking system and send registration information if necessary. Upon registering with the obligation tracking system 202, a user 216 may upload friends or contacts to the obligation tracking system from a friend list and/or contact list (e.g., a friend list maintained by the social network service 210, a contact list on the user's wireless device, etc.) or the user may enter friends or contacts manually. The user 216 may also select payment options for providing funds to and receiving funds from the obligation tracking system 202. For example, the user may select to provide and receive funds through ACH transfers, credit card, gift certificate, wire transfers, etc. The user 216 may also provide preferred methods for notifying the user and or friends regarding obligations and/or benefits. For example, the user 216 may elect to have all friends with outstanding obligations notified of an obligation and/or payment requested every month or every 6 months. Information about each user may be stored in one or more databases 280 communicatively coupled or connected to the obligation tracking system 202.

In one embodiment, a user's wireless device 260 may have an application that allows the user 216 to connect with a social network service and update or change the user's profile. It may also allow the user to view his or her obligation status along with the obligation status of other users in the social network service 210 and/or obligation tracking system 202. The application may also allow the user 216, in response to an expense incurred by the user, to quickly and easily send a request to the obligation tracking system 202 to have an obligation associated with another user. For example, user A may purchase movie tickets for a group of friends (users B, C, and D). Using an application on the user's wireless device 260, user A may send a request to the obligation tracking system 202 to have a benefit associated with user A in the amount of the movie tickets and an obligation associated with users B, C, and D in the amount of each movie ticket. The obligation tracking system 202 may then send a notice of the request to each of users B, C, and D so that these users may accept to assume the obligation. The notice may be provided to an email address, to a wireless device (e.g., via an application of a wireless device, text or IM message, etc.), or through any other method. Likewise, the acceptance may be received from users B, C, and D in a similar fashion.

User A may upload an image of the movie tickets to the obligation tracking system 202. The image may be associated with the obligations and/or with the benefit to provide evidence of the expense incurred. In addition, the obligation tracking system may record the time and date of the expense. The image may be provide via a picture taken with the wireless device, a scanner, or any other imaging application and/or hardware device. Alternatively, the image may be mailed to a provider of the obligation tracking system. The wireless device applications may also allow the group of friends to check the obligation status of each friend to determine who should purchase the movie tickets. For example, if one of the group of friends has a significant net negative obligation status, the group of friends may determine to have that friend purchase the movie tickets to repay some of the outstanding obligations.

As illustrated, the obligation tracking system 202 may connect directly with a user's computer 250 and/or wireless device 260 to provide the obligation tracking services. In other embodiments, kiosks (not shown) may be provided at various locations to allow users 216 to connect with the obligation tracking system 202. As previously described, users 216 may track obligations for any user associated with the obligation tracking system 202 regardless of whether the users are associated with the same social network service (or associated with a social network service at all). For example, user A, who may be connected with a social network service 210 that provides business profiles, may connect and track obligations associated with user B, who may not be associated with any social network service or may be associated with a social network service that provides recreational or personal profiles. The obligation tracking system 202 may also connect or communicatively couple with one or more merchants to provide the services previously described.

The obligation tracking system 202 may further connect or communicatively couple with one or more financial institutions 240 to facilitate the transfer of funds between individuals. In an exemplary embodiment, the obligation tracking system may communicatively couple with a money transfer system 270 that provides money transfer services as described with reference to FIG. 3. The financial institutions 240 and/or money transfer system 270 may provide and/or maintain financial accounts 220 for the individuals associated with the obligation tracking system 202. Funds can be transferred to and/or from the financial accounts 220 of the users 216. In one embodiment, the obligation tracking system 202 may provide and maintain the financial accounts 220. In still another embodiment, the obligation tracking system 202 may connect or communicatively couple with a business or employer so that funds provided to the user 216 from the business and/or employer are automatically routed to an account 220 associated with the user and/or routed to another user or the community pool to repay one or more obligations.

As previously described, there are several ways in which funds can be transferred by or with the assistance of the obligation tracking system 202. In one embodiment, the funds are transferred directly between users 216 (e.g., between user's accounts 220) so that as one user repays an obligation, another user's benefit is paid. In another embodiment, the funds received by the obligation tracking system may be put into a community pool of funds, out of which the benefits of other users will be paid so that no individual benefit payment is directly connected to an individual obligation payment. The payment of benefits may be determined by the obligation tracking system based on predetermined criteria (e.g., oldest benefits paid first, funds are split evenly between all benefits, etc.). In such an embodiment, the users 216 may be unaware of when obligations are repaid and by whom. In essence, each user may only be aware of a running tally of his or her obligations and benefits as well as a tally of other users. This embodiment adds a level of privacy to all users. Such an embodiment may be ideal for situations involving a break down of an association or friendship because the payment of benefits is not directly connected with the payment of obligations in a soured relationship.

The obligation tracking system 202 may also be configured to automatically debit funds from users 216 who may have significant outstanding obligation balances. For example, the obligation tracking system 202 may automatically withdraw funds from a user's account 220 if the obligation balance reaches a certain threshold or if one or more obligations have been outstanding for a certain amount of time (e.g., $15 owed for over 6 months or 1 year). The obligation tracking system 202 may notify a user 216 that the funds will be automatically withdrawn if one or more obligations remains unpaid.

The obligation tracking system 202 may also be configured to provide obligation reminders (pings) to users 216 associated with the system. The obligation reminders or pings can be automatically set by users or manually provided. For example, a user 216 may schedule the obligation tracking system 202 to provide obligation reminders on the first of every month or when obligation balances reach a specified threshold. The user 216 can also direct the obligation tracking system 202 to notify any or all their friends that owe an obligation. A user 216 may also provide reminders manually. For example, a user 216 may wish to receive payment for one or more benefits. To receive payment, the user 216 may direct the obligation tracking system 202 to notify any or all friends who owe an obligation to repay the obligation. Where the funds are kept in a community pool, the reminder may be sent to all users that owe an obligation. One advantage among many of the obligation tracking system providing reminders is that the burden on an individual to collect on a debt or obligation is removed and placed on the obligation tracking system.

In addition, as previously described, the obligation tracking system 202 may allow a user to withdraw funds from a community pool of funds to pay for a benefit. The funds may be withdrawn from the community pool and credited to the user's account 220. When a user elects to withdraw funds from the community pool to pay for a benefit, the benefit may be transferred from the user to the obligation tracking system. When an obligation associated with the transferred benefit is repaid, the funds may go directly into the community pool so that the community pool is replenished.

The obligation tracking system may offer the various services described herein via different service packages. For example, the obligation tracking system 202 may offer a gold service package that provides all of the features described herein while also offering a silver or lesser service package that may provide some, but not all, of these services. The service packages may be available to users 216 based on the payment of a fee, the length of use of the system, the user's performance in repaying obligations, the number of obligations and/or benefits incurred in a specified time, etc. In addition, although the obligation tracking system 202 has been described as separate from the social network services 210, the financial institutions 240, and the money transfer system 270. Any of these entities may operate and/or maintain the obligation tracking system 202. For example, the obligation tracking system 202 may be maintained by the money transfer system 270 so that a single entity provides both obligation tracking services and money transfer services.

Figure 3:
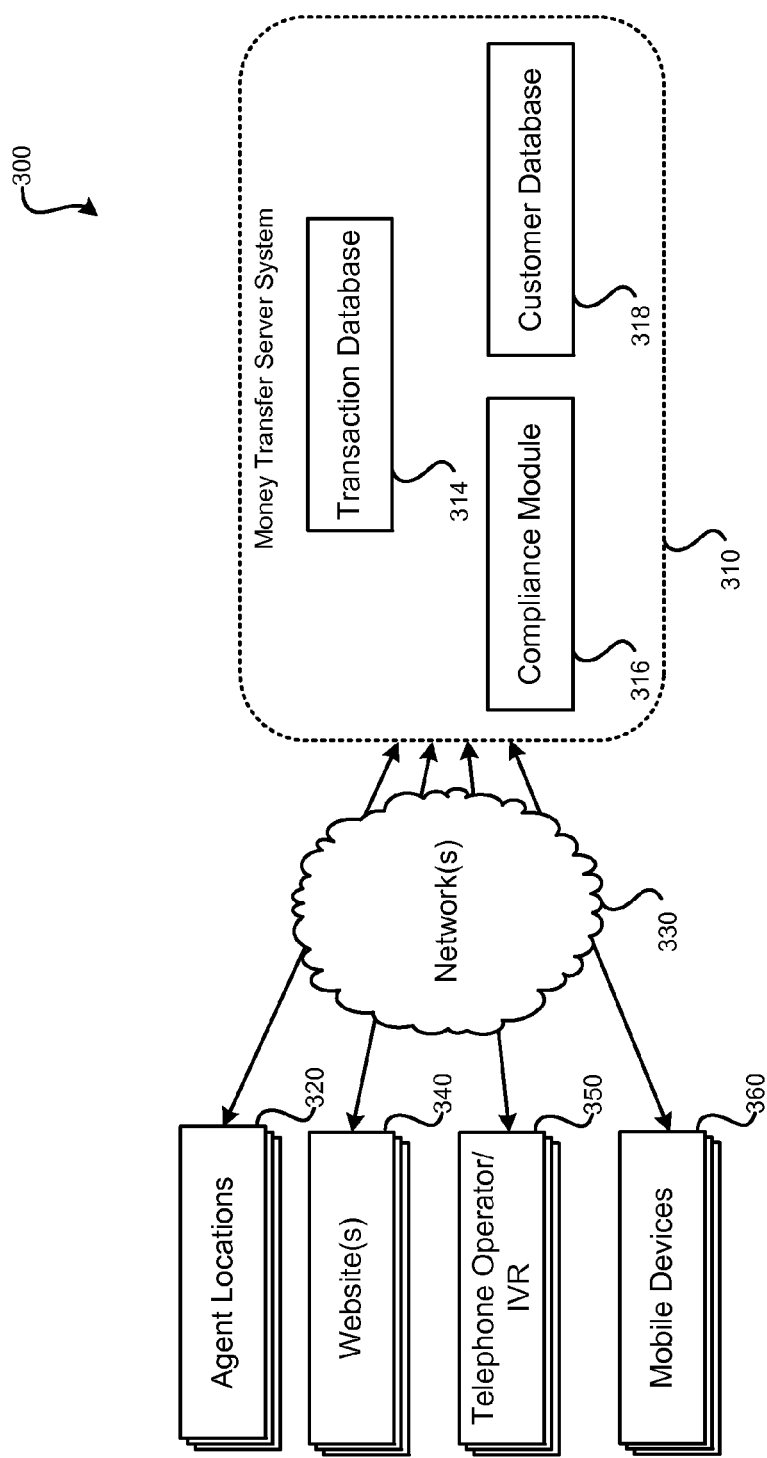
FIG. 3 illustrates a simplified block diagram of an embodiment of a money transfer system.

FIG. 3 illustrates a block diagram of an exemplary embodiment of a money transfer system 300 that may be used to transfer funds to repay obligations and/or pay benefits and that may also provide and/or maintain the obligation tracking system described herein. Such a money transfer system may be operated by an entity such as WESTERN UNION and may be capable of performing a variety of money transfer transactions between users of the obligation tracking system (e.g., from payors to payees). For example, money transfer system 300 may be capable of performing wire transfers. A wire transfer may be made from one party to another party, and may involve the transfer of one or more types of currency. Money transfer system 300 may include one or more agent locations 320, one or more websites 340, telephone operator and/or interactive voice response (IVR) systems 350, mobile devices 360, a money transfer server system 310, a transaction database 314, a compliance module 316, and/or a customer database 318.

Agent locations 320 may represent various kiosks and/or other physical locations where individuals (payors and payees) may conduct money transfer transactions. At agent locations 320, a person, such as a clerk, may serve as a representative of the entity providing the money transfer service. Individuals (payors and payees) may conduct money transfer transactions by interacting directly with an agent of the money transfer entity at an agent location. Transactions conducted at an agent location may be conducted using a variety of different payment methods including cash, checks, credit cards, debit cards, stored value cards, etc. Alternatively or additionally, individuals may interact directly with a kiosk that is part of the money transfer system 300 or the agent may interact with the kiosk on behalf of individuals.

Money transfer system 300 may include one or more websites. Such websites may allow individuals (payors and payees) to conduct money transfer transactions via the Internet. A payor may provide payment and transaction information to money transfer system 300 via website 340. For example, a payor may provide bank account information or credit card information to money transfer system 300 via website 340. Likewise, payees may receive a payment sent via money transfer system 300 via website 340. For example, it may be possible for a payee to provide a bank account number for funds to be deposited via website 340. Website 340 may also permit a payor or payee to determine the status of a money transfer transaction. If a payor is conducting the money transfer using a bank account, credit card, stored value card, or using some other payment method besides cash, he or she may be able to conduct the entire payor-side transaction using the website 340. Likewise, if the payee is receiving the funds via a method other than cash, he or she may be able to complete his payee-side transaction using website 340. Alternatively, if either the payor and payee is conducting the transaction in cash, some of the information necessary to conduct the money transfer transaction may be supplied via website 340, with the cash being transacted at an agent location of agent locations 320.

Money transfer system 300 may also include a telephone operator and/or interactive voice response (IVR) system 350. Telephone operator and/or IVR system 350 may allow an individual (payor and/or payee) to conduct the money transfer transaction via a telephone call to the telephone operator and/or IVR system 350. Individuals may provide the information necessary to conduct the money transfer transaction via the telephone, either to a human operator, or to an interactive voice response system. Also, it may be possible to interact with money transfer system 300 via mobile devices 360. Mobile Device 360 may represent various wireless devices that can communicate with money transfer system 300. For example, Mobile Device 360 may include cellular telephones, smart phones, laptops, tablet computers, etc. Mobile devices 360 may load a website to interact with money transfer system 300. Alternatively, mobile devices 360 may run one or more pieces of software, such as applications or firmware configured to allow interaction with money transfer system 300. Via mobile devices 360, it may be possible for a payor to transmit funds to a payee. Also, it may be possible for a payee to receive funds via mobile devices 360.

Agent locations 320, website 340, telephone operator and/or IVR system 350, and mobile devices 360 may communicate with money transfer server system 310 via a network 330. Network 330 has been represented as a single network in FIG. 3. This is for simplicity only, network 330 may include several networks. Further, the network used for agent locations 320 to communicate with money transfer server system 310 may be different from the network used by mobile devices 360 to communicate with money transfer server system 310. The network 330 may include one or more public networks, such as the Internet, and one or more private networks, such as a corporate intranet. Further, multiple networks may be used to communicate with money transfer server system 310. For example, mobile devices 360 may use a wireless cellular provider's network and the Internet to communicate with money transfer server system 310.

Whether an individual (payor) provides funds to the money transfer system 300 via agent locations 320, website 340, telephone operator and/or IVR system 350, or mobile devices 360, this may not affect how another individual (payee) may receive the funds. For example, while a payor may provide funds via website 340, a payee may retrieve the funds via one of agent locations 320. It may also be possible for a payor to use the same entity, such as agent locations 320, to conduct a money transfer transaction.

Money transfer server system 310 may include one or more various subsystems used to conduct a money transfer transaction. For example, a customer database 318 may be present. Customer database 318 may store biographical information about the money transfer service provider's customers (payors and payees). Transaction database 314 may store information on pending and completed money transfer transactions. Transaction database 314 may identify amounts of funds provided by an individual, amounts of funds to be paid, the individuals names (payor and/or payee's name), transaction identifiers such as money transfer control numbers (MTCNs), the locations where the transactions were initiated (e.g., the website, an address of the agent location), the location of where the transaction is expected to be completed (e.g., where the payee is expected to receive the funds), the payor's payment method (e.g., cash, credit card, money order, stored value card, check, etc.), and whether or not various money transfer transactions have been completed or are pending.

Compliance module 316 may be used to ensure compliance with government regulations. For example, the money transfer service provider operating the money transfer system 300 may be required to comply with various government regulations (possibly varying by country) intended to prevent fraudulent and/or illegal use of money transfer systems. An example of a compliance measure that the money transfer service provider may use is a list of persons that the money transfer service provider is prohibited from doing business with published by the Office of Foreign Asset Control (OFAC). The money transfer service provider may be required by law to not do business with (e.g., as a payor or payee) persons published on such a list. Other compliance measures may include gathering additional information about individual conducting a money transfer that exceeds a particular amount and/or is international. Money transfer transactions being conducted with cash may also include additional compliance measures. Therefore, depending on the location of the individuals (payor and payee), the amount of the money transfer, and the payment method, each money transfer may be subject to varying levels of examination and regulation by compliance module 316.

In one embodiment, the entity that provides and maintains the money transfer system 300 may also provide and maintain the obligation tracking system. In another embodiment, the money transfer system 300 may be the same system and/or a subsystem of the obligation tracking system so that a single system provides the obligation tracking features described in FIGS. 1 and 2 and provides the funds transfer services described in FIG. 3. One advantage among many of the obligations tracking system and money transfer system being the same system or maintained by the same entity may be the seamless interaction between tracking benefits and obligations and settling those obligations and benefits. The money transfer system 300 may be incorporated into the obligation tracking system and/or social network services so that users are provided with the option to settle obligations by clicking on a link to the obligation tracking system and/or money transfer system 300 to thereby perform one or more of the funds transfer operations described in FIG. 3. In addition, the money transfer system 300 and/or the obligation tracking system may charge a fee for the funds transfer services such as a service fee, transaction fee, advertisement fee, interests, etc.

While FIG. 3 has been described in relation to a money transfer system 300, the above description is applicable to and may be used by any financial institution to provide a transfer of funds between individuals associated with the obligation tracking system and/or social network service. For example, the above system may be used by a bank or credit card provider to transfer funds between individuals. The above system may also include one or more accounts into which the funds are withdrawn and/or deposited. The accounts may be maintained by the entity providing the money transfer system 300 or by any other entity.

Figures 4, 5:
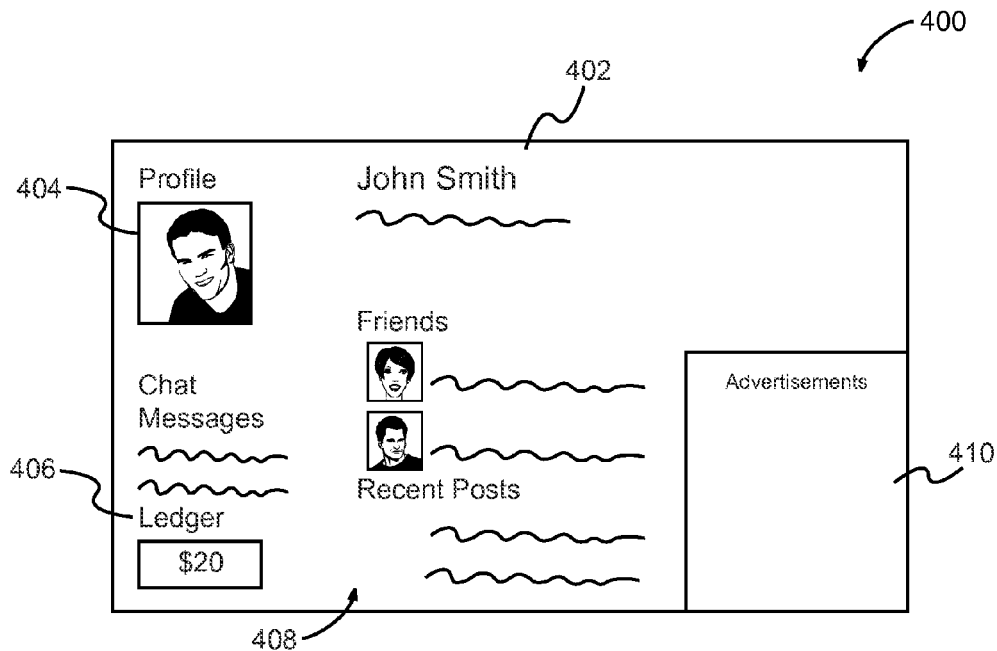
FIG. 4 illustrates an embodiment of a user profile that includes an indicator of the user's obligations and/or benefits.
FIG. 5 illustrates an embodiment of a ledger associated with a user's profile that may be used to track obligations and/or benefits associated with the user.

FIG. 4 depicts an embodiment of a user profile 400 that may include an indicator 406 of the user's obligations and/or benefits. The user profile 400 may be provided and/or maintained by a social network service and/or the obligation tracking network. The user profile 400 may include the user's name 402, a picture or illustration 404 of the user, one or more advertisements 410, information about the user 408 and/or about friends or associates connected to the user, the indicator or ledger 406 that indicates the obligation status of the user, along with any other information (e.g., business information, personal information). The indicator or ledger 406 may be color coded to indicate if the user's obligation status is net positive or negative as described previously. In one embodiment, the indicator 406 may also include a value that shows the amount that the user is either net positive or net negative. The value may be a sum of the user's obligations and/or benefits. The user and/or social network service may control who may view the indicator 406 for each user. For example, the indicator 406 may only be displayed to friends and/or associates that have related obligations and/or benefits (past or present) or may be displayed to friends and/or associates that have participated in the obligation tracking system. In one embodiment, the user may elect to display the indicator 406 to any user that views the user's profile. The indicator may also show past settlements or repayments that the user has made to reflect the user's payment history and/or ability to settle obligations.

FIG. 5 depicts an embodiment of a ledger 500 associated with a user's profile that may be used to track obligations and benefits associated with the user. The ledger may be viewable only to the user by clicking on a link on the user's profile, for example by clicking on the indicator 406. The link may provide a separate ledger page or window or produce a sub-window within the user profile that displays the ledger. The ledger may have several fields that show the various obligations and/or benefits associated with the user including a name field 502, an expense field 504, an amount field 506, a date field 508, a settled field 510, etc. The name field 502 may indicate a friend or associated that corresponds with an obligation and/or benefit. The expense field 504 may indicate the expense either incurred by the user for a friend or associate or incurred by a friend or associate for the user. The amount field 506 may indicate the value of the expense and the date field 508 may indicate the date the expense was incurred. The settled field 510 may indicate whether the user has repaid an obligation and/or been paid or received a benefit.

For example, the name field 502 may indicate that a friend, Tim, is associated with a benefit to the user of $5 corresponding with a lunch purchased by the user on May $12^{th}$ and that the benefit has not been settled, or in other words, that the friend, Tim, has not repaid the $5. Similarly, the ledger may indicate that another friend, Deangelo, is associated with an obligation of the user of $20 corresponding with a parking ticket that Deangelo paid on behalf of the user on June $3^{rd}$ and that the user has not settled this obligation, or in other words, the user has not repaid the $20. The ledger may highlight outstanding obligations (significant amounts and/or significant dates) and/or benefits that have not been paid to make the user aware of obligations they owe and benefits they have yet to receive. In addition, as previously described, the obligation tracking system can be configured so that as Tim repays the $5, the $5 may be transferred directly to Deangelo (or is split between Deangelo and Tanisha) to repay the user's obligations.

While the ledger illustrated in FIG. 5 provides obligations and benefits having specific monetary values, the ledger may also include obligations and expenses that do not include monetary amounts as previously described. For example, the ledger may indicate that the friend, Tim, has an obligation to watch the user's dog on a specific date or at some time in the future in exchange for the expense incurred by the user for lunch or for some other favor the user provided (e.g., lending Tim a car). The ledger may track this obligation until a notice is provided that the obligation has been settled (e.g., Tim provides a settlement request that the user accepts). Thus, the ledger and obligation tracking system are not limited to situations involving the transfer of funds.

Figure 6:
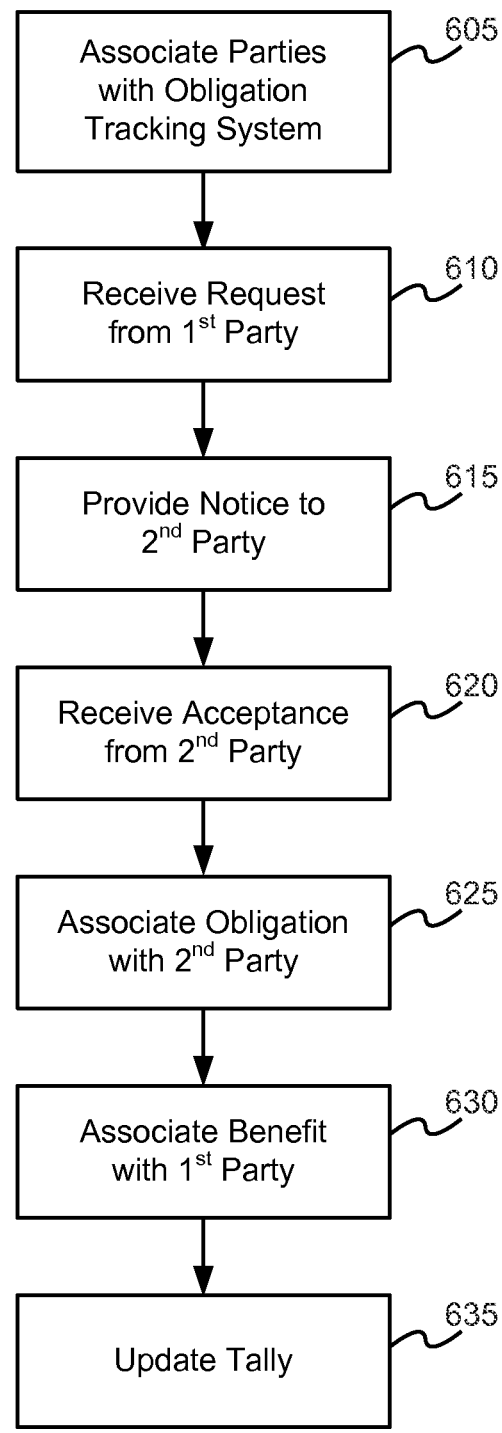
FIG. 6 illustrates one embodiment of a method for tracking obligations with an obligation tracking system.

FIG. 6 illustrates one embodiment of a method 600 for tracking obligations with an obligation tracking system. The obligation tracking system may be configured to keep an account of obligations incurred between individuals associated with the obligations tracking system and/or with a social network service. At block 605, one or more parties may be associated with the obligation tracking network. The parties may be associated with the obligation tracking system by registering with the system and/or by registering with a social network service. At block 610, a request from a first party associated with the obligation tracking system may be received at the obligation tracking system and/or social network service. The request may include an expense incurred by the first party for the benefit of a second party. The request may also include a registration request for the first party to register with the obligation tracking system. The request may be received through a variety of means including a text message, SMS message, MMS message, an email, a request provided to an agent of a money transfer system, a request generated or provided by an application of a wireless device (e.g., an application of a smart phone), an online submission from a website of a social network service or the obligation tracking system, or any other method.

The request may also include an expense incurred by the first party for the benefit of a third party. For example, the first party may pay for lunch for both the second party and the third party. Similarly, the request may additionally include an expense incurred by a fourth party for the benefit of the second and/or third party, such as when the first and fourth party split the bill to pay for lunch for the second and third party. In essence the request may include any number of parties that incur the expense and any number of parties that benefit from the expense. The obligation tracking system may assign a benefit to each party that incurs an expense and assign an obligation to each party that benefits from an expense in relation to the expense incurred and the benefit received for each party. At block 615, the obligation tracking system and/or the social network service may provide a notice of the request to the second party, third party, and/or other party for acceptance to assume an obligation. The notice may also include registration information so that the party may register with the obligation tracking system. At block 620, the obligation tracking system and/or social network service may receive an acceptance from the second party, third party, and/or other party to assume an obligation associated with the expense. The obligation may be substantially equal in value to the expense incurred for each party and/or may reflect the expense incurred and the date the expense was incurred.

At block 625, the obligation tracking system and/or social network service may associate an obligation with each of the second party, the third party, and/or other party. At block 630, the obligation tracking network and/or social network service may associate a benefit with each of the first party, the fourth party, and/or other party that has incurred an expense. Each benefit may be substantially equal in value to the expense incurred by a particular party. At block 635, the obligation tracking system and/or social network service may update a tally that is associated with the first party, second party, third party, fourth party, etc., to reflect the respective obligations and/or benefits of each of the parties. The tally may include a sum of the obligations and/or benefits of each party. The benefit and/or tally may be displayed on a profile associated with the first party, the fourth party, etc., such as through an indicator described in FIG. 4. The benefit may also be included on a ledger, such as that described in FIG. 5. Likewise, the obligation may be displayed on a profile associated with the second party, the third party, etc., through a similar indicator and may also be included on a ledger.

In one embodiment, the obligation tracking system interfaces with a social network service to provide information about the benefit, the obligation, and/or the updated tallies. In another embodiment, the obligation tracking system interfaces with the social network service to provide information about expenses incurred and the social network service assigns benefits, obligations, and/or updates tallies. In addition, the obligation tracking system may transfer benefits and/or obligations between parties to help parties settle or repay obligations and/or receive benefits.

Figure 7:
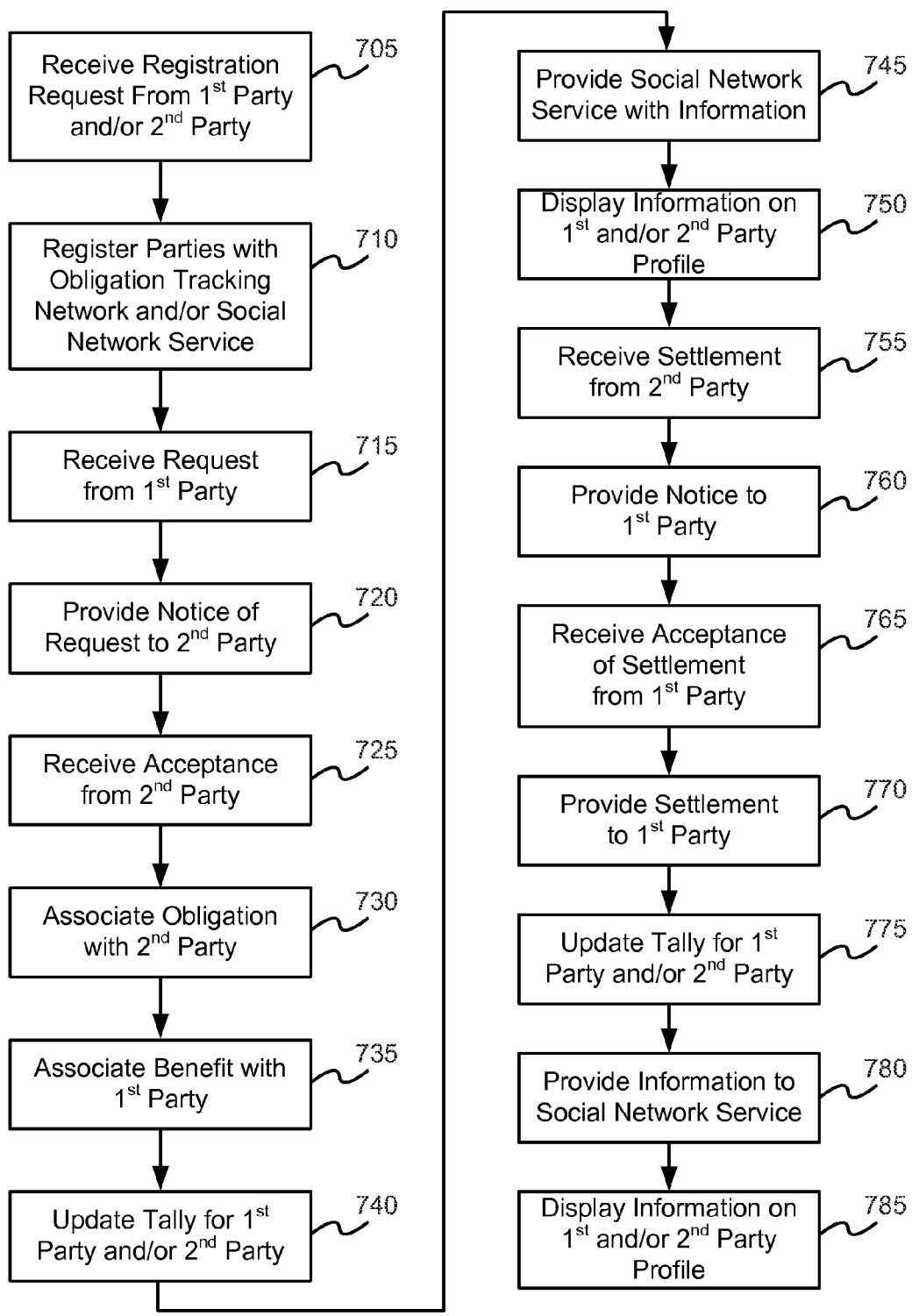
FIG. 7 illustrates another embodiment of a method for tracking and/or settling obligations with an obligation tracking system.

FIG. 7 illustrates another embodiment of a method for tracking and/or settling obligations with an obligation tracking system. At block 705, the obligation tracking system may receive a registration request from a first party, a second party, and/or any other party that wishes to register with the obligation tracking system and/or social network service. As described above, in some embodiments the registration process may occur with the request to assign obligations and/or benefits or may occur as the obligation tracking system provides a notice of such requests. At block 710, each party may be registered with the obligation tracking system and/or social network service. At block 715, the obligation tracking service receives a request form a first party to associate an obligation with a second party. Both parties may be associated with a social network service or may be associated with the obligation tracking system only. The request may include an expense that was incurred by the first party for the benefit of the second party. As described previously, the request may include additional parties (third party, fourth party, etc.) that may either have incurred an expense or benefited therefrom; however, the method of FIG. 7 is described mainly with reference to the first and second party only, although it should be realized that additional parties may be included.

At block 720, the obligation tracking system provides a notice of the request to the second party for acceptance. To provide the request, the obligation tracking system may acquire information about the second party from the social network service and/or through another application, such as by receiving the information from a friend or contact list of the social network service or wireless device. For example, the first party's wireless device may include an obligation tracking system application that allows the user to send a request and that provides the party's contact or friend list so that the party may quickly select friends or associates to assign an obligation or benefit to. The obligation tracking system may provide the notice to the second party's cell phone, email account, etc. At block 725, the obligation tracking system receives an acceptance from the second party to assume an obligation associated with the expense. The obligation may be substantially equal in value to the expense. At block 730, the obligation tracking system may associate the obligation with the second party. At block 735, the obligation tracking system may associate a benefit with the first party. The benefit may be substantially equal in value to the expense.

At block 740, the obligation tracking system may update a tally for the first party and/or the second party to reflect the obligation and/or benefit associated with each party. Alternatively, the obligation tracking system may provide information about the benefit and/or obligation to the social network service, which may update a tally associated with the first and/or second party. The tally may be a sum of the benefits and obligations associated with each party. At block 745, the obligation tracking system may provide the social network service with information about the benefit, the obligation, and/or the tally associated with each of the parties. At block 750, the social network service and/or the obligation tracking system may display the information (i.e., benefit, obligation, tally) on a profile associated with each of the first party and/or the second party.

At block 755, the obligation tracking system may receive settlement information from the second party. The settlement information may include funds to be used to repay an obligation and/or an indication that a favor has been provided and/or expense incurred by the second party for the benefit of the first party. For example, the settlement request may indicate that the second party paid for movie tickets for the first party or watched the first party's dog to satisfy an outstanding obligation. The settlement request may indicate that these favor are to be used to settle a portion or all of one or more obligations associated with the second party. At block 760, the obligation tracking system may provide a notice of the settlement request to the first party for acceptance. At block 765, the obligation tracking system may receive an acceptance of the settlement request from the first party. The acceptance may indicate that the expense incurred and/or favor rendered by the second party settle one or more obligations. The settlement request, notice, and/or acceptance may be provided and received in any manner, such as those previously described.

At block 770, when the settlement request includes a payment of funds, the obligation tracking system may provide the settlement to the first party, such as by transferring funds to the first party and/or crediting an account associated with the first party. The account may be maintained by the obligation tracking system or by another entity, such as a financial institution. Providing the funds to the first party may include providing funds via an ACH debit, a check, a credit card transaction, cash via an agent of a money transfer system and/or the obligation tracking system, loading a stored value card, providing a gift card, etc. As previously described, the obligation tracking system may also transfer benefits and/or obligations between parties. For example, if a third party owes an obligation to the second party and the third party provides funds to pay the obligation, the funds may be transferred from the second party to the first party to pay an obligation owed by the second party to the first party.

At block 775, the obligation tracking system and/or social network service may update a tally associated with the first party and/or second party by reducing an obligation associated with the second party by the settlement amount and/or reducing a benefit associated with the first party by the settlement amount to reflect the settlement. Alternatively, the obligation tracking system may reduce an obligation by the settlement amount and/or reduce a benefit by the settlement amount and provide information about the settlement and reduced obligation and benefit to the social network service. Upon receiving this information, the social network service may update a tally associated with each of the first and second party. At block 780, the obligation tracking system may provide information about the benefit, the obligation, and/or the tally to one or more social network services, which may be the same or different social network services. At block 785, the information (i.e., benefit, obligation, settlement, tally) may be displayed on a profile of the first party and/or a profile of the second party maintained by the social network service and/or the obligation tracking system.

Figure 8:
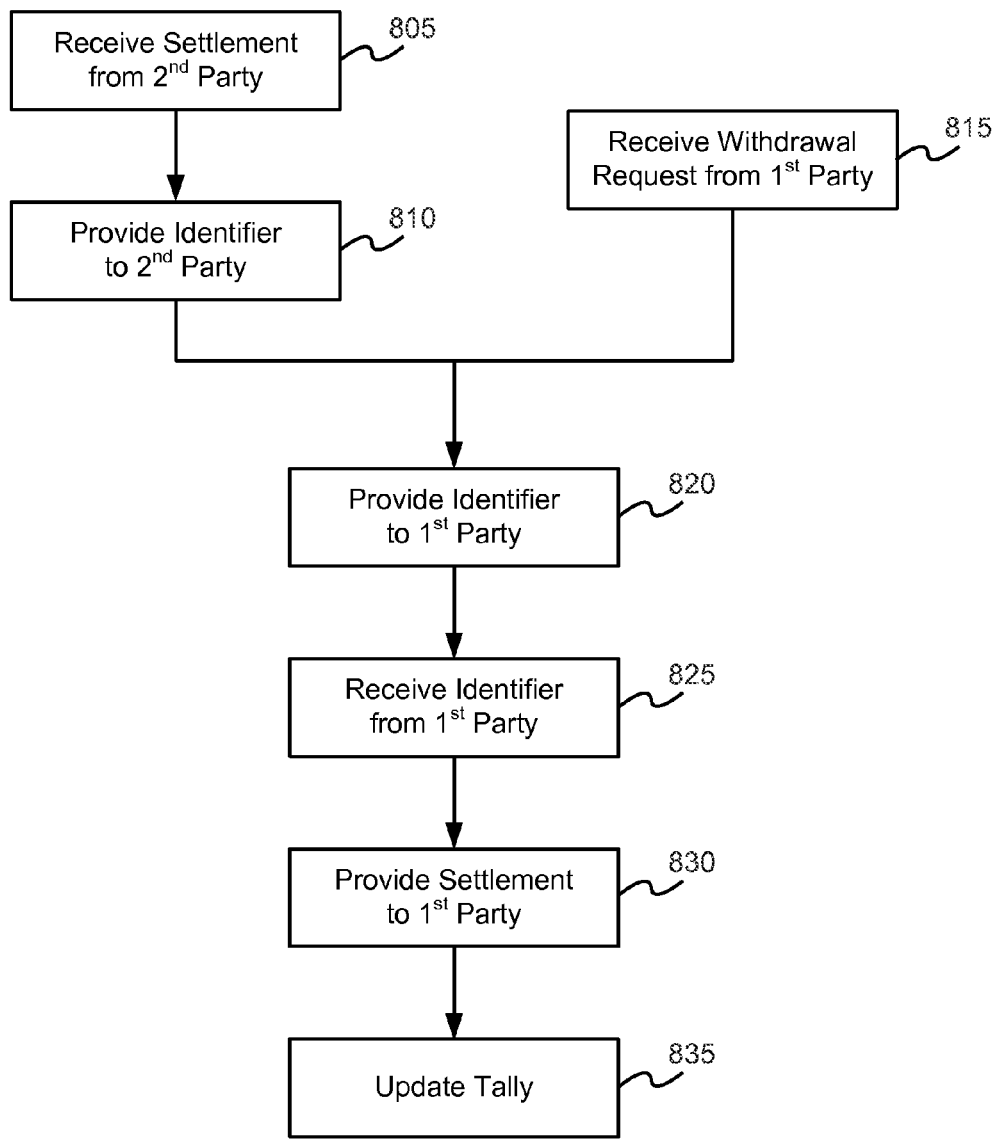
FIG. 8 illustrates an embodiment of a method for settling obligations with an obligation tracking system.

FIG. 8 depicts an exemplary embodiment of a method for settling obligations with an obligation tracking system. The method described in FIG. 8 typically involves the transfer of funds between individuals. To transfer the funds, the method may use a money transfer system, such as the money transfer system described in FIG. 3. At block 805, the obligation tracking system and/or money transfer system may receive a settlement from a second party (or other party). The settlement may include the second party providing cash to an agent of a money transfer system, providing credit card information, a check, etc. The method may include receiving a notification request form the first party that directs the obligation tracking system to notify the second party to pay one or more obligations. The settlement may be received in response to the notification being provided to the second party. At block 810, the obligation tracking system and/or money transfer system may provide an identifier to the second party. The identifier may be used for tracking and/or accounting purposes to resolve any dispute regarding whether a specific obligation has been settled. The identifier may be any combination of letters and/or number and/or other symbols and may be a money transfer control number (MTCN) as previously described.

Alternatively, at block 815, the first party may request to withdraw or receive payment for a benefit before an associated obligation has been paid, in which case the obligation tracking system and/or money transfer system may provide funds and transfer the first party's benefit to the obligation tracking system and/or money transfer system as previously described. The first party may request payment of a benefit by connecting with a website of the money transfer system and/or obligation tracking system, visiting an agent in person, sending a request from an application of a mobile device, email, text, etc.

At block 820, the obligation tracking system and/or money transfer system may provide the first party with an identifier. The identifier may be in response to receiving funds from the second party or may be in response to the first party requesting withdrawal or payment of a benefit. The identifier may be provided via any of the methods described herein such as email, text, printed receipt, etc. The identifier may include the same alphanumeric number or MTCN provided to the second party or may be a different number or MTCN. In one embodiment, the second party provides the identifier (MTCN) to the first party upon receiving the identifier from the obligation tracking system and/or money transfer system. At block 825, the obligation tracking system and/or money transfer system receives the identifier (MTCN) from the first party. The identifier may be received in person at an agent of the money transfer system and/or obligation tracking system, online via a website, through email, text, wireless device application, etc. At block 830, in response to receiving the identifier, the funds may be provided to the first party through any of the methods described herein. For example, the first party may provide the identifier in person to an agent of the money transfer system and receive cash or a check from the agent. The user may also enter the identifier into a website or provide the identifier via text, email, etc. and receive cash from an agent or have an account of the first party credited with the funds. At block 835, a tally associated with the first party and/or second party may be updated to reflect the settlement.

A brief example of the some of the services of the obligation tracking services may involve a group of friends going to dinner. The group of friend may check an application on a cell phone to determine which of the friends has the most significant obligation status, such as the largest net negative balance or longest outstanding obligation. The application may link to a profile of each of the group of friends provided by one or more social network services or may obtain the obligation status of each of the friends. The group of friends may determine which person or persons will cover the cost of the dinner (i.e., determine the payor(s)). After paying the bill, the payor may use an application on his or her cell phone to send a request to the obligation tracking system to have an obligation associated with each friend in the group of friends (the payor may also perform this step before paying for the bill, such as after accepting to cover the meal). The payor may scroll through the cell phone's contact list and/or scroll through a friend list on the user's social network profile to select the friends that benefited from the payor's dinner expense.

Upon receiving the request, the obligation status may send a notice to each of the selected friends indicating that the payor has requested each of the friends to assume an obligation associated with the expense. The notice may also include the date and/or expense incurred by the payor (i.e., the dinner). The notice may be sent to each of the friend's cell phone or to an email account. Upon receiving an acceptance to assume the obligation from each of the friends, the obligation tracking system may associate an obligation with each of the friends. The obligation tracking system may also associate a benefit with the payor. Subsequently, the obligation tracking system may send periodic reminders to one or more of the friends to remind them about the unpaid obligation.

The obligation tracking system may receive funds and/or settlement requests from each of the friends to settle each of the obligations. Upon receiving funds, the obligation system may transfer the funds to the payor and settle the obligation with respect to the friend that provided the funds. The obligation tracking system may also reduce the payor's benefit accordingly. To receive and/or provide the funds, the obligation tracking system (or money transfer system) may provide one or more friends and/or the payor with a MTCN. Upon receiving settlement requests, such as a request that indicates one or more of the friends paid for a subsequent meal on behalf of the payor, the obligation tracking system may provide a notice of the settlement request to the payor. The payor may provide an acceptance or rejection of the settlement request and the associated obligations and benefit may be adjusted accordingly. This process may continue until all obligation have been settled and the payor has been fully reimbursed for the dinner expense.

The above example is for illustration purposes only and is not meant to limit the invention in any way. It should be noted that other examples may be provide that include additional or fewer steps, that include additional or fewer individuals, and/or different obligations. For example, the obligation tracking system may include a community pool of funds as previously described and/or may include the transfer of benefits between individuals.

Figure 9:
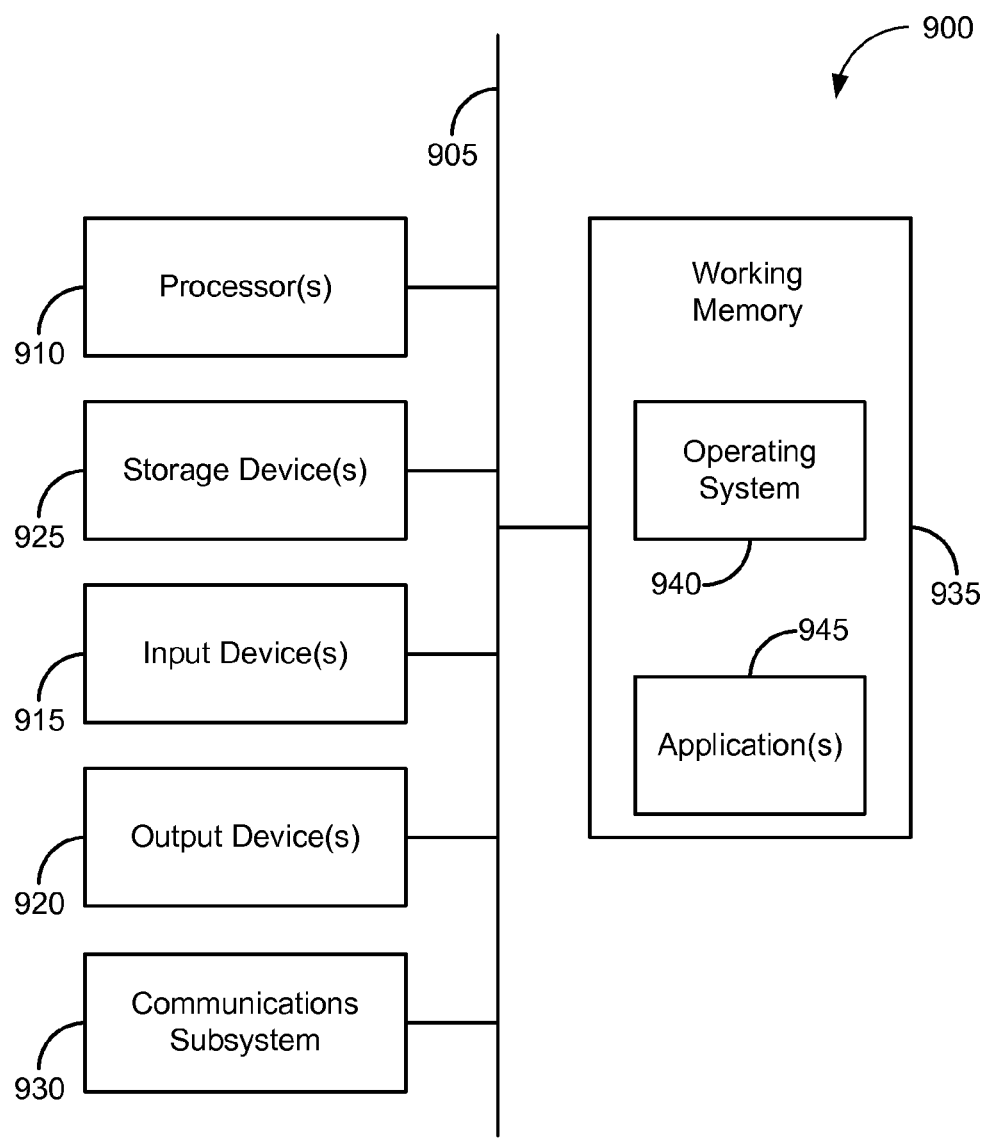
FIG. 9 illustrates a computer system that may be used to implement the systems and methods described herein.

FIG. 9 provides a schematic illustration of one embodiment of a computer system 900 that can perform the methods of the invention, as described herein, and/or can function as, for example, the money transfer system 300 and/or obligation tracking system 100, 200. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements can include one or more processors 910, including, without limitation, one or more general-purpose processors and/or one or more special-purpose processors (such as digital signal processing chips, graphics acceleration chips, and/or the like); one or more input devices 915, which can include, without limitation, a mouse, a keyboard and/or the like; and one or more output devices 920, which can include, without limitation, a display device, a printer and/or the like.

The computer system 900 may further include (and/or be in communication with) one or more storage devices 925, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 900 might also include a communications subsystem 930, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network, and/or any other devices described herein. In many embodiments, the computer system 900 may further comprise a working memory 935, which can include a RAM or ROM device.

The computer system 900 can also comprise software elements, shown as being currently located within the working memory 935, including an operating system 940 and/or other code, such as one or more application programs 945, which may comprise computer programs to perform the operations of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 900) to perform methods of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another machine-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 900, various machine-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 925. Volatile media includes, without limitation, dynamic memory, such as the working memory 935. Transmission media includes coaxial cables, copper wire and fiber optics, including the wires that comprise the bus 905, as well as the various components of the communication subsystem 930 (and/or the media by which the communications subsystem 930 provides communication with other devices).

Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc., carried by the signals) to the working memory 935, from which the processor(s) 905 retrieves and executes the instructions. The instructions received by the working memory 935 may optionally be stored on a storage device 925 either before or after execution by the processor(s) 910.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A tracking system for tracking obligations incurred between individuals associated with a social network service, the tracking system comprising:
   a communication interface that enables the tracking system to interface with the social network service;
   a processor; and
   a non-volatile memory medium comprising instructions that direct the processor to perform the following operations:
   receiving a request from a first user of the social network service, wherein the request comprises an expense incurred by the first user for purchase of an item or service on behalf of a second user of the social network service;
   providing a notice of the request to the second user, the notice comprising a description of the item or service purchased by the first user;
   receiving, from the second user, a confirmation that:
   the item or service was purchased on behalf of the second user; and
   the second user will assume an obligation associated with the expense, wherein the obligation is substantially equal in value to the expense;
   associating the obligation with the second user in response to receipt of the confirmation;
   associating a benefit with the first user in response to receipt of the confirmation, wherein the benefit is associated with the expense, and wherein the benefit is substantially equal in value to the expense; and
   interfacing with the social network service via the communication interface to provide the social network service with information about at least one of the obligation and the benefit.

2. The tracking system of claim 1, where the operations further comprise:
   receiving an acceptance from a third user of the social network service to assume an additional obligation associated with an expense incurred by the second user on behalf of the third user;
   associating the additional obligation with the third user;
   associating an additional benefit with the second user; and
   transferring the additional benefit from the second user to the first user to settle at least a portion of the obligation associated with the second user.

3. The tracking system of claim 2, wherein the operations further comprise:
   receiving a settlement from the third user to satisfy at least a portion of the additional obligation;
   providing the settlement to the first user; and
   reducing the additional benefit by the value of the settlement.

4. The tracking system of claim 1, wherein the operations further comprise:
   updating a first tally associated with the first user to reflect the benefit, wherein the first tally comprises a sum of benefits and obligations associated with the first user; and
   updating a second tally associated with the second user to reflect the obligation, wherein the second tally comprises a sum of benefits and obligations associated with the second user.

5. The tracking system of claim 1, wherein the request further comprises an additional expense incurred by the first user on behalf of a third user associated with the social network service; and the method further comprises:
   providing a notice of the request to the third user;
   receiving an acceptance from the third user to assume an additional obligation associated with the additional expense, wherein the additional obligation is substantially equal in value to the additional expense;
   associating the additional obligation with the third user;
   associating an additional benefit with the first user, wherein the additional benefit is associated with the additional expense, and wherein the additional benefit is substantially equal in value to the additional expense; and
   interfacing with the social network service via the communication interface to provide the social network service with information about at least one of the additional benefit and the additional obligation.

6. The tracking system of claim 1, wherein:
   the request further comprises an additional expense incurred by a fourth user on behalf of the second user,
   the acceptance from the second user comprises an additional acceptance to assume an additional obligation associated with the additional expense, wherein the additional obligation is substantially equal in value to the additional expense; and
   the operations further comprise:
   associating the additional obligation with the second user; and
   associating an additional benefit with the fourth user, wherein the additional benefit is associated with the additional expense, and wherein the additional benefit is substantially equal in value to the additional expense.

7. The tracking system of claim 1, wherein the operations further comprise:
   receiving a settlement request from the second user, wherein the settlement request comprises an expense incurred by the second user to satisfy at least a portion of the obligation;
   providing a notice of the settlement request to the first user;
   receiving an acceptance of the settlement request from the first user;
   reducing the obligation by an amount substantially equal to the expense incurred by the second user; and
   reducing the benefit by the amount substantially equal to the expense incurred by the second user.

8. The tracking system of claim 1, wherein the operations further comprise:
   receiving settlement funds from the second user to satisfy at least a portion of the obligation;
   transferring the settlement funds to the first user;
   reducing the obligation by an amount substantially equal to the settlement funds; and
   reducing the benefit by the amount substantially equal to the settlement funds.

9. The tracking system of claim 1, wherein the request is received in one or more formats selected from the group consisting of:
   a text message;
   a SMS message;
   a MMS message;
   an email;
   a request provided to an agent of a money transfer system;
   a request from an application of a wireless device; and
   an online submission.

10. An obligation tracking system communicatively coupled with one or more social network services that provide social networking between individuals, the obligation tracking system being configured to perform the following operations:
    receiving a request from a first user of a first social network service, wherein the request comprises an expense incurred by the first user on behalf of a second user of a second social network service, wherein the first and second social network services are different social network services that each provide non-financial services to users;
    providing a notice of the request to the second user;
    receiving, from the second user, a confirmation that:
      the item or service was purchased on behalf of the second user; and
      the second user will assume an obligation associated with the expense, wherein the obligation is substantially equal in value to the expense;
    associating the obligation with the second user in response to receipt of the confirmation;
    associating a benefit with the first user in response to receipt of the confirmation, wherein the benefit is substantially equal in value to the expense;
    providing the first social network service with information about the benefit;
    providing the second social network service with information about the obligation;
    receiving a settlement from the second user to satisfy at least a portion of the obligation;
    providing the settlement to the first user; and
    providing the first social network service and the second social network service with information about the settlement.

11. The obligation tracking system of claim 10, wherein the operations further comprise:
    associating the settlement with the first user and the second user;
    updating a first tally associated with the first user, wherein the first tally comprises a sum of benefits, obligations, and settlements associated with the first user; and
    updating a second tally associated with the second user, wherein the second tally comprises a sum of benefits, obligations, and settlements associated with the second user.

12. The obligation tracking system of claim 10, wherein the first social network service and the second social network service are different social network services.

13. The obligation tracking system of claim 10, wherein:
    receiving a settlement from the second user comprises receiving funds from the second user, and providing the settlement to the first user comprises transferring the funds to a first account associated with the first user.

14. The obligation tracking system of claim 13, wherein the first account is maintained by the obligation tracking system.

15. The obligation tracking system of claim 10, wherein the settlement comprises funds provided from one or more sources selected from the group consisting of:
an ACH debit;
a check;
a credit card;
cash provided to an agent of the obligation tracking system;
a stored value card; and
a gift card.

16. The obligation tracking system of claim 10, wherein:
receiving a settlement from the second user comprises receiving funds from the second user, and
providing the settlement to the first user comprises:
providing an identifier to the first user in response to receiving the funds;
receiving the identifier from the first user; and
providing the funds to the first user in response to receiving the identifier.

17. The obligation tracking system of claim 10, wherein the operations further comprise receiving a notification instruction from the first user, wherein the notification instruction directs the obligation tracking system to notify the second user to provide the settlement.

* * * * *